(12) United States Patent
Litvak

(10) Patent No.: US 9,305,239 B2
(45) Date of Patent: Apr. 5, 2016

(54) DETECTING AND PROCESSING SMALL TEXT IN DIGITAL MEDIA

(71) Applicant: Samsung Electronics Co., Ltd., Suwon-Si, Gyeonggi-Do (KR)

(72) Inventor: Shai Litvak, Ramat Gan (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 32 days.

(21) Appl. No.: 14/276,433

(22) Filed: May 13, 2014

(65) Prior Publication Data

US 2015/0332120 A1 Nov. 19, 2015

(51) Int. Cl.
*G06K 9/34* (2006.01)
*G06K 9/62* (2006.01)
*G06T 7/00* (2006.01)
*G06K 9/48* (2006.01)

(52) U.S. Cl.
CPC .............. *G06K 9/6202* (2013.01); *G06K 9/482* (2013.01); *G06K 9/6215* (2013.01); *G06T 7/0081* (2013.01); *G06K 2009/487* (2013.01)

(58) Field of Classification Search
USPC .......... 382/176, 177, 181, 298, 237; 340/540, 340/573.1; 345/156, 157, 158, 467, 471; 715/234; 704/9; 725/39, 44, 58
See application file for complete search history.

(56) References Cited

U.S. PATENT DOCUMENTS 5,761,344 A * 6/1998 Al-Hussein .................... 382/237
7,489,297 B2 * 2/2009 Hohmann et al. ............. 345/158
8,035,526 B2 * 10/2011 Needham et al. ........... 340/573.1
8,422,783 B2    4/2013 Yuan et al.
2011/0222769 A1 9/2011 Galic et al.
2012/0224765 A1 9/2012 Kim et al.
2012/0281139 A1 11/2012 Zhang et al.

FOREIGN PATENT DOCUMENTS

JP      2009123206 A   6/2009
KR      100745753 B1   8/2007
KR      20110042665 A  4/2011

OTHER PUBLICATIONS

Epshtein et al., Detecting Text in Natural Scenes With Stroke Width Transform, IEEE, Jun. 2010.
Chen et al., Detecting and Reading Text in Natural Scenes, IEEE, 2004.
Li et al., Automatic Text Detection and Tracking in Digital Video, pp. 1-38, Dec. 1998.

(Continued)

*Primary Examiner* — Anh Do
(74) *Attorney, Agent, or Firm* — Harness, Dickey & Pierce, P.L.C.

(57) ABSTRACT

A method for recognizing small-font sized text including receiving digital media of a natural scene, the digital media having at least one frame that includes the small-font sized text; generating input maps having values that reflect local properties of corresponding regions in the at least one frame; and detecting regions of the at least one frame that contain the small-font sized text by integrating information from the input maps. The integrated information may include information located between border lines having active pixels therebetween and gaps having a high ratio of non-ink pixels located below a bottom border line and above a top border line in relation to a dominant direction of the text. The active pixels may be pixels having dense changes in character stroke directions.

20 Claims, 12 Drawing Sheets

(56) References Cited

OTHER PUBLICATIONS

Subramanian et al., Character-Stroke Detection for Text-Localization and Extraction, IEEE Computer Society, 2007.

Freeman et al., Example-Based Super-Resolution, Mitsubishi Electric Research Laboratory, Aug. 2001.

Yang et al., Image Super-Resolution Via Sparse Representation, IEEE, Oct. 2010, pp. 1-13.

Glasner et al., Super-Resolution From a Single Image, Weizmann Institute of Science, 2009.

Freedman et al., Image and Video Upscaling From Local Self-Examples, Hebrew University of Jerusalem, 2009, 11 pages.

* cited by examiner

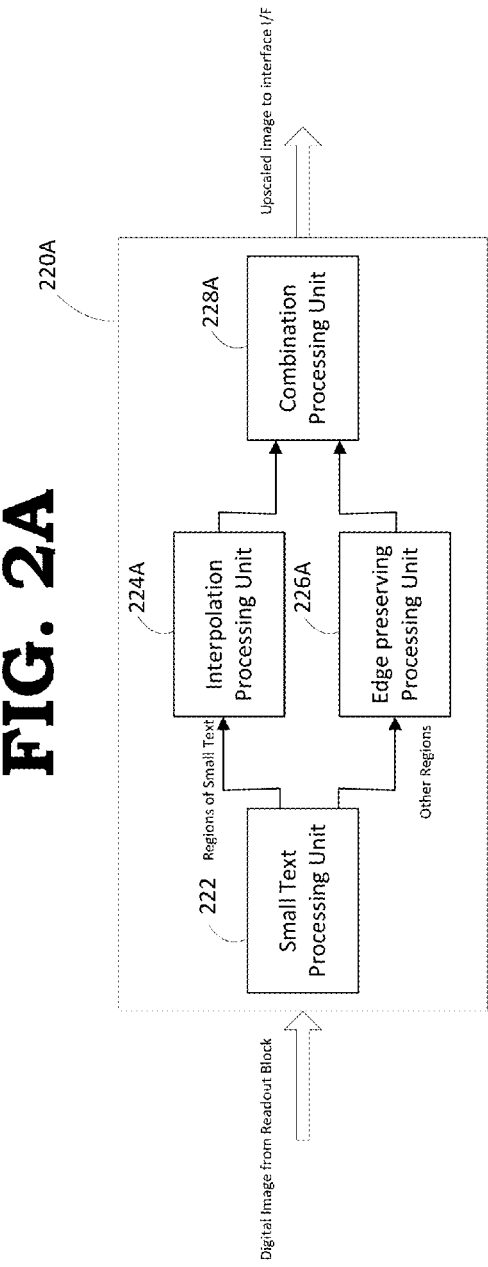
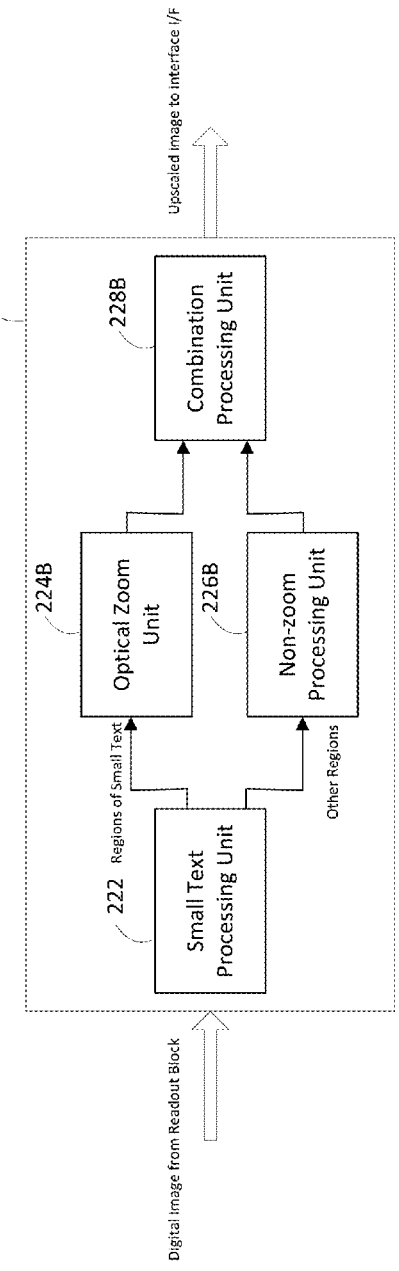

DETECTING AND PROCESSING SMALL TEXT IN DIGITAL MEDIA

BACKGROUND

Imaging devices such as cameras, camcorders, scanners, mobile phones and other user equipment may utilize an image sensor configured to capture digital media, for example digital images and/or video.

The captured digital media may contain text information. The text information may be captured from within a document or captured from within a natural scene, for example, users of mobile phones often take pictures and/or video of scenes that contain text information such as street signs, billboard signs, etc.

In processing the digital media, it may be desirable to localize the areas of the digital media that contain the text information such that the areas that contain the text information are processed differently than natural scene areas of the digital image. For example, it may be desirable to apply different image processing techniques to the text information rather than applying conventional image-processing algorithms, such as denoising, sharpening and super-resolution, which may result in undesired artifacts within the text information. Further, it may be desirable to localize areas of the digital media that contain the text information such that the imaging device may optically zoom in on the text information to increase clarity thereof.

Localizing areas within a natural scene may be difficult because a natural scene exhibits a wide range of imaging conditions, such as noise and blur and may not be as formally structured as a scanned document, for example, text information in natural scenes may be in random poses, colors, sizes and shapes. Therefore, it may be difficult to determine areas in a digital image of a natural scene that contain the text information.

The difficulty in detecting text information in natural scenes may be exacerbated when the text information is relatively small in size (e.g. 3-5 pixels in height). Conventional methods to detect the text information contained within digital media may be based on either local features or global features of the digital media. However, these conventional methods may not be well suited to detect small text as conventional methods typically extract relatively large visual features, such as the width of the strokes from the letters. These large visual features may not be evident in small text whose font size is 3-5 pixels in height.

SUMMARY

At least one example embodiment relates to a method for recognizing small-font sized text.

In at least one embodiment, the method includes receiving digital media of a natural scene, the digital media having at least one frame that includes the small-font sized text; generating input maps having values that reflect local properties of corresponding regions in the at least one frame; and detecting regions of the at least one frame that contain the small-font sized text by integrating information from the input maps.

In at least one embodiment, the local properties of the regions include contrast, gradient and activity level of pixels within the regions.

In at least one embodiment, the integrated information includes information located between border lines having active pixels therebetween and gaps having a high ratio of non-ink pixels located below a bottom border line and above a top border line in relation to a dominant direction of the text.

In at least one embodiment, the small-font sized text is text that is between two and six pixels in height.

In at least one embodiment, the generating input maps includes, generating an active pixel map indicating locations of dense changes in character stroke directions within the regions.

In at least one embodiment, the generating the active pixel map includes, for each pixel, statistically measuring the variability of gradient directions of surrounding pixels.

In at least one embodiment, the generating input maps further includes, generating a local gradient magnitude and direction map indicating a gradient and direction within each of the regions; generating a dominant direction map indicating, for each pixel, a dominant direction of text lines within the at least one frame in a region surrounding the pixel, the dominant direction being a statistically representative value of the writing direction of character in the region and generating a high contrast mask and a high gradient using the gradient magnitude, the high contrast mask indicating a relationship between a luminance of each pixel with a statistical measure of luminance of the region surrounding the pixel and the high gradient mask indicating a relationship between a gradient magnitude of each pixel with a statistical measure of gradient magnitudes in a region surrounding the pixel.

In at least one embodiment, the dominant direction map is generated by applying spatial spectral-analysis using a Fourier-related transform to the frame region surrounding the pixel, the dominant direction being perpendicular to the direction of the periodic pattern of the text lines in the region surrounding the pixel.

In at least one embodiment, the detecting regions of the at least one frame that contain the small-font sized text includes, determining if a number of sufficiently large differences in gradient directions between pairs of adjacent pixels surrounding a test pixel is greater than a threshold.

In at least one embodiment, the detecting regions of the at least one frame that contain the small-font sized text further includes, determining if a top and a bottom of a line suspected to contain the small-font sized text contains a high ratio of ink pixels, the ink pixels being pixels having a high contrast in comparison to neighboring pixels; determining if a gap between two lines suspected to contain the small-font sized text contains a high ratio of non-ink pixels; and determining if an internal area in a single line suspected to contain the small-font sized text contains a high ratio of the active pixels and a low ratio of dense ink line pixels.

At least one example embodiment relates to a method of processing small font sized text.

In at least one embodiment, the method includes receiving digital media of a natural scene, the digital media having at least one frame that includes the small-font sized text; generating input maps having values that reflect local properties of corresponding regions in the at least one frame; and detecting regions of the at least one frame that contain the small-font sized text by integrating information from the input maps; and processing the regions detected to contain small font sized text in a manner different from the regions that do not contain small font sized text.

In at least one embodiment, the processing of the regions detected to contain the small font sized text includes, upscaling the regions determined to contain the small-font sized text in a different manner than the regions determined not to contain the small-font sized text.

In at least one embodiment, the regions determined to contain the small-font sized text are upscaled using interpolation and the regions determined not to contain the small-font sized text are upscaled using a sharp edge preserving method.

In at least one embodiment, the processing of the regions detected to contain the small font sized text includes, performing an optical zoom procedure on the regions determined to contain the small-font sized text; and recapturing the regions determined to contain the small-font sized text at a higher optical zoom.

At least one example embodiment relates to a small-text recognition apparatus configured to recognize small-font sized text in at least one frame of a received digital media.

In at least one embodiment, the apparatus includes a processor configured to, generate input maps having values that reflect local properties of corresponding regions in the at least one frame, and detect regions of the at least one frame that contain the small-font sized text by integrating information from the input maps.

In at least one embodiment, the processor is configured to generate input maps by, generating an active pixel map indicating locations of dense changes in character stroke directions within the regions.

In at least one embodiment, the processor is configured to detect the regions of the at least one frame that contain the small-font sized text by, determining if a number of sufficiently large differences in gradient directions between pairs of adjacent pixels surrounding a test pixel is greater than a threshold.

In at least one embodiment, the apparatus further includes an optical zoom unit including an optical lens, the optical lens configured to zoom in on the regions determined to contain the small-font sized text.

At least one example embodiment relates to an imaging device.

In at least one embodiment, the imaging device includes an image sensor configured to capture digital media having at least one frame that includes small-font sized text; and the small-text recognition apparatus configured to recognize small-font sized text in at least one frame of a received digital media.

At least one example embodiment relates to a non-transitory computer readable medium including a computer program.

In at least one embodiment, the computer program includes computer program instructions configured to implement a method of recognizing small-font sized text when executed by a processor.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the embodiments.

FIGS. 2A and 2B each illustrate a schematic block diagram of an image signal processor included in a digital signal processor according to respective example embodiments;

Figure 1:
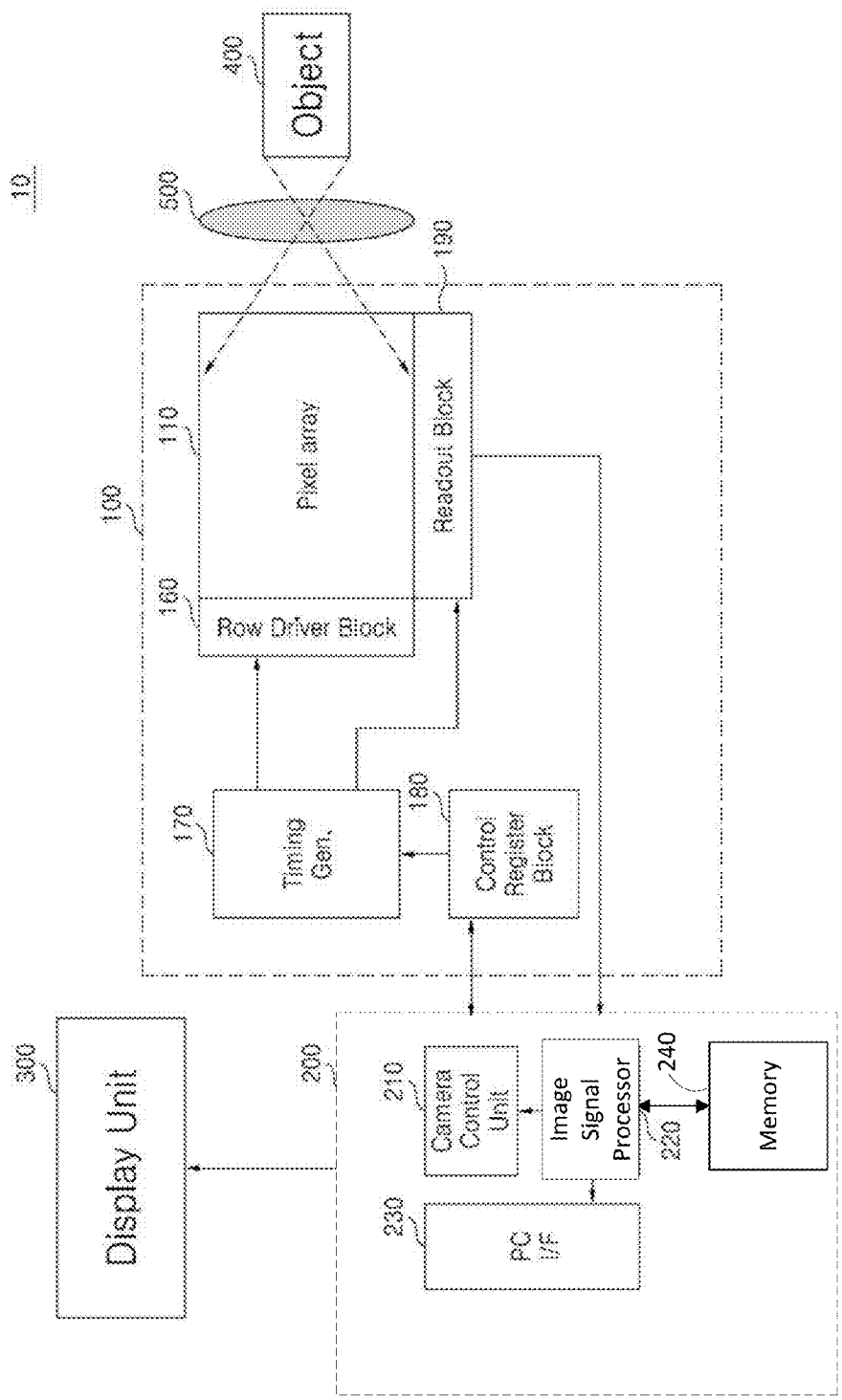
FIG. 1 is a schematic block diagram of an image sensing system according to an example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional operations not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

FIG. 1 is a schematic block diagram of an image sensing system according to an example embodiment.

Referring to FIG. 1, an image sensing system 10 includes an image sensor 100, a digital signal processor 200, a display unit 300, and/or a lens 500.

The image sensing system 10 may be used in a digital camera or a digital camera-equipped portable device such as mobile user equipment. The image sensing system 10 may sense an image of an object 400 input through the lens 500 according to a control of the digital signal processor 200.

The image sensor 100 may include a pixel array 110, a row driver block 160, a timing generator driver 170, a control register block 180 and a readout block 190.

The pixel array 110 may include a plurality of pixels in which a plurality of rows and columns are arranged in a matrix form. The pixel array 110 senses light using a plurality of photoelectric conversion elements (e.g., a photo diode or a pinned photo diode) and converts the light into an electrical signal, thereby generating an image signal.

Each of the plurality of pixels may include a color filter. For example, the color filter may be a red filter passing light in a red wavelength region, a green filter passing light in a green wavelength region, or a blue filter passing light in a blue wavelength region.

According to an example embodiment, the color filter may be a cyan filter, a magenta filter, or a yellow filter. Each of the plurality of pixels may sense light using the photo sensitive element, and generate an image signal, e.g., a pixel signal, by converting the sensed light into an electrical signal.

The digital signal processor 200 may include a camera control unit 210, an image signal processor 220, an interface (I/F) 230 and a memory 240.

The camera control unit 210 may control the image sensor 100 via the control register block 180 using an inter-integrated circuit ($I^2C$); however, example embodiments are not restricted thereto.

An image signal may be generated by the image sensor 100 and converted by the readout block 190. The image signal processor 220 may convert the image signal to an image and/or video by processing the image signal. The image signal processor 220 may output the generated image to a display unit 300 via the interface (I/F) 230 and/or store the generated image and/or video in the memory 240. The display unit 300 may include any device capable of displaying an image. For example, a Liquid Crystal Display (LCD) a plasma display device (PDP), an organic light emitting diode (OLED), a solar cell, and the like, however, example embodiments are not limited thereto.

Within the image sensor 100, the timing generator 170 may control the row driver block 160 and the readout block 190 by outputting corresponding control signals thereto. Further, the control register block 180 may control an operation of the image sensor 100 according to a control of the camera control unit 210. The row driver block 160 may drive a row of the pixel array 110 by generating a row selection signal based on a row control signal generated by the timing generator 170. The pixel array 110 may output a pixel signal from the driven row selected by the row selection signal and the gate selection signal, which are provided from the row driver block 160, to the readout block 190. The readout block 190 may temporarily store the pixel signal from the pixel array 110 and may include an analog-to-digital converter that converts the pixel signals to a digital image and outputs the converted digital image to the image signal processor 220.

FIGS. 2A and 2B each illustrate a schematic block diagram of an image signal processor included in a digital signal processor according to respective example embodiments.

Referring to FIGS. 1, 2A and 2B, the image signal processor 220 may include software that when executed, configures the image signal processor 220 to perform the functions of a hybrid image upscale unit 220A and/or a selective optical zoom unit 220B. Both the hybrid image upscale unit 220A and the selective optical zoom unit 220B may include a small text processing unit 222 that receives digital media from the readout block 190. The small text processing unit 222 will be discussed in detail below with reference to FIGS. 3 and 4.

The hybrid image upscale unit 220A may further include an interpolation processing unit 224A, an edge preserving processor 226A and a combination processing unit 228A.

The selective optical zoom unit 220B may further include an optical zoom unit 224B, a non-zoom processing unit 226B and a combination processing unit 228B.

The small text processing unit 222 may determine regions within the received digital media that contain small text such that the small text regions may be processed differently from other regions within the digital media.

For example, within the hybrid image upscale unit 220A, the small text processing unit 222 may instruct the interpolation processing unit 224A to upscale the small text regions using interpolation. The small text processing unit 222 may instruct the edge preserving processor 226A to upscale regions that do not contain small text using edge-preserving algorithms.

Within the selective optical zoom unit 220B, the small text processing unit 222 may instruct the optical zoom unit 224B to collect higher resolution content in the small text regions. Further, the small text processing unit 222 may instruct the non-zoom processing unit 226B to perform various non-optical zoom functions on the regions that do not contain small text. For example, the non-zoom processing unit 226B may perform edge-preserving upscaling.

The combination processing units 228A/228B may combine the upscaled regions to form an upscaled digital media and provide the upscaled digital media to the interface 230.

It should be also understood that the image signal processor 220 may include features not shown in FIGS. 2A and 2B and should not be limited to those features that are shown. Further, while the processors 222/224/226/228 are illustrated as being within the image signal processor 220, they may be embodied outside of the image signal processor 220.

Figure 3:
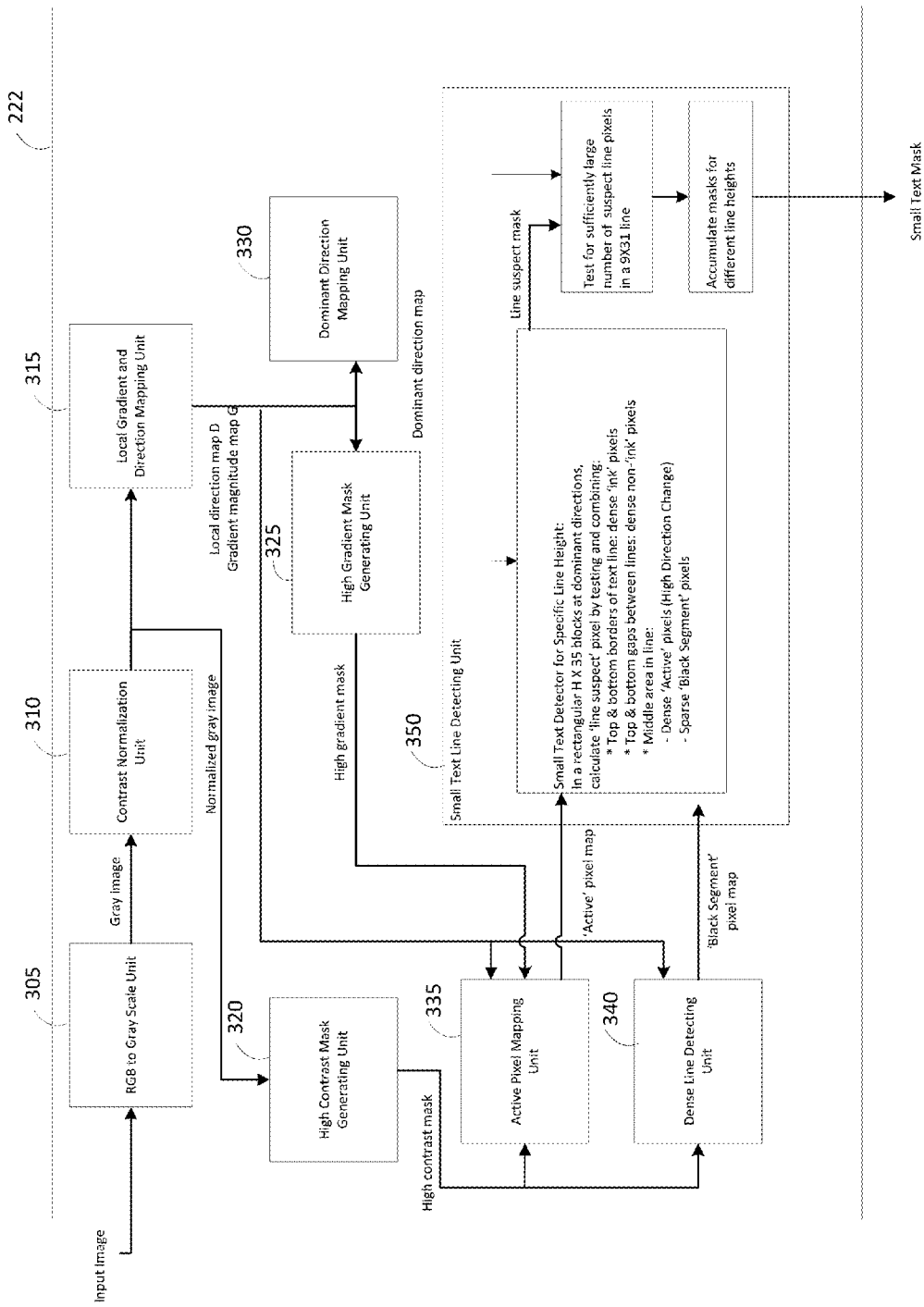
FIG. 3 illustrates a small text processing unit according to an example embodiment.

FIG. 3 illustrates a small text processing unit according to an example embodiment.

As illustrated in FIG. 3, the image signal processor 220 may include software that when executed, configures the small text processing unit 222 to perform functions of various functional units including a Red Green Blue (RGB) to Gray Scale Unit 305, a Contrast Normalization unit 310, a Local Gradient and Direction Mapping Unit 315, a High Contrast Mask Generating Unit 320 and a High Gradient Mask Generating Unit 325, a Dominant Direction Mapping Unit 330, an Active Pixel Mapping Unit 335, a Dense Line Detecting Unit 340 and a Small Text Line Detecting Unit 350. Details on the operation of these various units will be discussed below with reference to FIG. 4.

Figure 4:
FIG. 4 illustrates a small text detection method according to an example embodiment.

FIG. 4 illustrates a small text detection method according to an example embodiment.

Referring to FIGS. 1-4, as illustrated in FIG. 4, in a process S400, the small text processing unit 220 may perform one or more passes over received digital media to analyze the pixels contained therein.

In operation S410, the small text processing unit 220 may produce a normalized grayscale image from the received digital media. To produce the normalized grayscale image, the RGB to Grayscale Unit 305 performs RGB to Grayscale conversion. The RGB to Grayscale conversion may be performed using any method known to one of ordinary skill in the art, and therefore, for the sake of brevity further description herein will be omitted.

Further, the Contrast Normalization Unit 310 normalizes the grayscale image by dividing each pixel intensity by a common denominator, for example, by dividing each pixel intensity by a linear function for the local mean intensity around the pixel.

In operation S420, the small text processing unit 220 may determine a local gradient and direction. More specifically, the Local Gradient and Direction Mapping Unit 315 may determine a local direction map and a gradient magnitude map. The local direction map may be a map of directions, in radians, of the local gradient. The local gradient may be calculated based on a convolution with a local filter applied horizontally and vertically. The local filter may be a [−1 0 1] filter. The convolution operation may defined by equation 1:

$$O(i, j) = \sum_{k=1}^{m} \sum_{l=1}^{n} I(i+k-1, j+l-1) K(k, l) \qquad \text{Equation 1}$$

where I is the input image and K is the filter matrix of size m by n.

To calculate the direction convolution is applied over the image twice, once horizontally and once vertically.

The horizontal convolution of the image I is calculated as $H = h_{ij} = I*A$, such that the horizontal convolution H is the result of convolving the image I with the filter A shown below. The vertical convolution of the image I is calculated as $V = v_{ij} = I*B$, such that the vertical convolution V is the result of convolving the image I with the filter B, shown below.

$$\begin{bmatrix} 0 & 0 & 0 \\ -1 & 0 & 1 \\ 0 & 0 & 0 \end{bmatrix} \qquad \text{Filter A}$$

$$\begin{bmatrix} 0 & -1 & 0 \\ 0 & 0 & 0 \\ 0 & 1 & 0 \end{bmatrix} \qquad \text{Filter B}$$

The Local Direction Map $D=d_{ij}$ may be calculated by $d_{ij}=$ atan$(h_{ij}/v_{ij})$ such that the Local Direction Map D represents the direction, in radians of the gradient of each pixel of the image I. The Gradient Magnitude Map $G=g_{ij}$ may be calculated by $g_{ij}=|h_{ij}|+|v_{ij}|$, such that the Gradient Magnitude Map may be a scalar representation of the magnitude of the gradient of each pixel of the image I. However, example embodiments are not limited thereto, and one of ordinary skill in the art will appreciate that the local direction and magnitude may be calculated differently.

In operation S430, the small text processing unit 220 may process, for each pixel p in the normalized grayscale image, an Ink Patch (IP) surrounding the pixel p to determine whether a center pixel P in the Ink Patch IP is an ink pixel. The Ink Patch IP may be a 13×13 patch of pixels of the normalized grayscale image produced in operation S410. The small text processing unit 220 may produce (i) a high contrast mask by evaluating a luminance of the center pixel in each Ink Patch IP with respect to a representative luminance value of the patch and (ii) a high gradient mask by evaluating the center pixel gradient magnitude with respect to a representative value of the gradient magnitude of the Ink Patch IP, based on the gradient magnitude map determined in operation S420.

The IP-s for different pixels may be highly overlapping. For a given pixel p and its corresponding Ink Patch IP, the coordinate of the pixel p in the High Contrast Mask is set to 1, indicating that p is an "ink" pixel, or 0, indicating a "non-ink" pixel by comparing a luminance of the center pixel p with a representative (e.g. median) luminance of the Ink Patch IP to determine if the brightness of p is sufficiently contrasted to that of the background such that the pixel may be determined to be part of an ink pattern. For example, if the background is white, a pixel may be determined as an ink pixel if the color of the pixel is "black". Likewise, if the background is black, a pixel may be determined as an ink pixel if the color of the pixel is "white".

The magnitude of a pixel's intensity may be expressed in terms of luminance where dark pixels have a low intensity, while light pixels have a high intensity. If the luminance of the center pixel is sufficiently less than the median luminance of the patch, for example, less than 0.7 times the medium luminance, the center pixel is masked as an "ink" pixel. In contrast, if the luminance of the center pixel is sufficiently greater than the median luminance of the patch, for example, more than 1.3 times the median luminance, the center pixel is masked as a "background" pixel.

Similarly, the High Gradient Mask Generating Unit 325 may process each pixel in the gradient magnitude map and mask it as a "high gradient" pixel or as a "low gradient" pixel by comparing a magnitude of the gradient of the center pixel with a representative (e.g. median) gradient of the patch of pixels.

In an example embodiment, for each pixel each pixel $p=(i,j)$, the High Gradient Mask Generating Unit may process a High Gradient Patch (HGP) of size 13 by 13 pixels surrounding each pixel $p=(i,j)$. A 1 (true) value, representing a gradient sufficient to be considered "a high gradient", is assigned in the corresponding pixel (i,j) of the high gradient mask if the gradient magnitude at the center pixel p of the patch HGP is above 2 times the median gradient taken over all pixels in the patch. Otherwise, a 0 (false) value is assigned in the high gradient mask.

In operation S435, the small text processing unit 220 may determine, for each pixel $p=(i,j)$, the dominant direction of lines in a large surrounding Dominant-Direction-Patch (DDP) in the gray scale image, where the dominant direction is the direction of the majority of text lines, which are typically parallel or nearly parallel. More specifically, the Dominant Direction Mapping Unit 330 may determine the dominant direction of lines in the patch by analyzing the patch for any periodic patterns of lines within the patch. For example, the Dominant Direction Mapping Unit 330 may perform a discrete cosine transform (DCT) on the patch to obtain a DCT image and analyze peaks within the DCT image to determine the typical direction of the lines and the spacing therebetween (e.g. the wave-length of the lines). DCT is similar to a discrete Fourier transform, but utilizes a cosine function to represent the image.

For example, a discrete cosine transform (DCT) may be performed on a Dominant-Direction-Patch DDP of 41 by 41 pixels surrounding pixel p in the gray scale image to generate a DCT image. After applying the DCT transform, the DCT image may be searched to identify the location (x,y) whose DCT value is maximal. The dominant direction of the processed pixel $p=(i,j)$ in the Dominant Direction Map may then be defined as $$dd_{ij} = \text{atan}\left(\frac{x}{y}\right).$$

In operation S440, the small text processing unit 220 may find active pixels by analyzing, for every pixel $p=(i,j)$, a surrounding small Active-Pixel-Patch (APP) of pixels in the local direction map, for example a 3 by 3 patch of pixels. More specifically, as discussed below with reference to FIG. 5, the active pixel mapping unit 335 may determine if the Active-Pixel-Patch (APP) is active based a number of pixel pairs in the APP having a sufficiently large difference in gradient directions.

Figure 5:
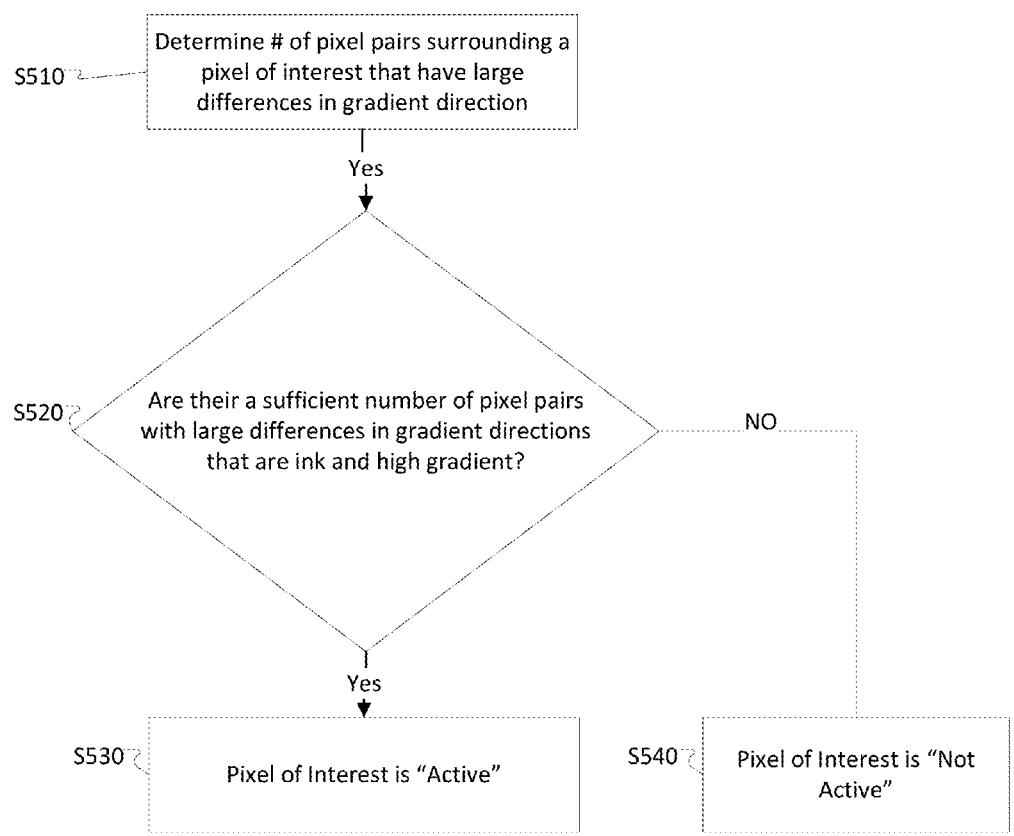
FIG. 5 is an example of a small text processing unit finding active pixels within a small patch of pixels according to an example embodiment.
Figure 6:
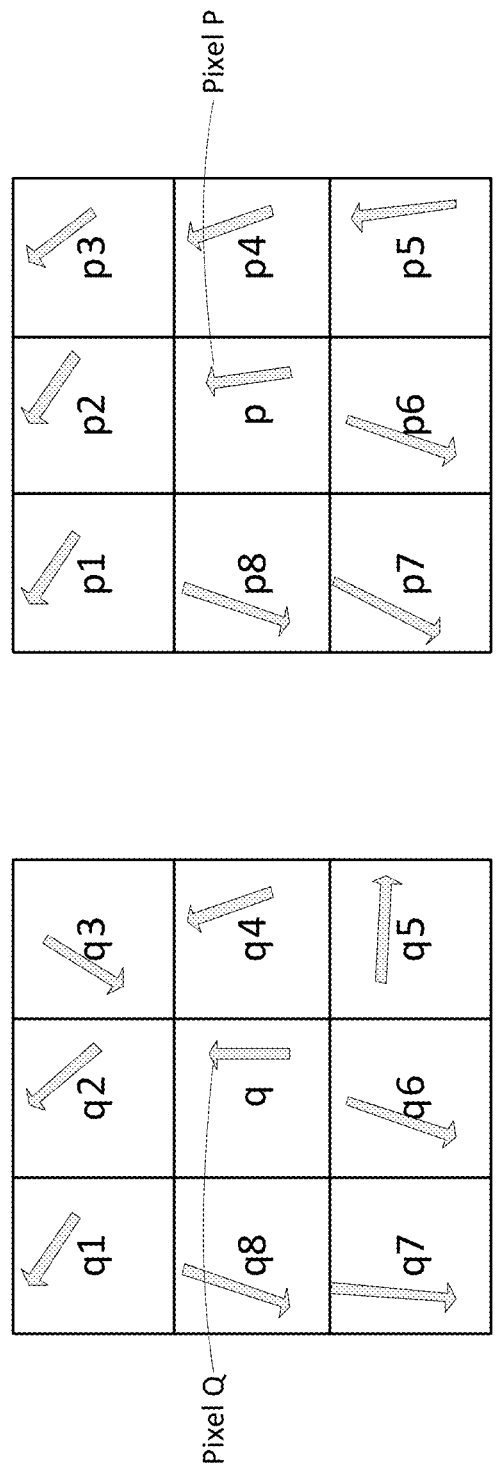
FIG. 6 is a Local Direction Map D used by a small text processing unit to identify active pixels according to an example embodiment.

FIG. 5 is a method of small text processing unit finding active pixels with a small patch of pixels according to an example embodiment. FIG. 6 is a Local Direction Map D used by a small text processing unit to identify active pixels according to an example embodiment.

Referring to FIGS. 5 and 6, in FIG. 6 there are eight (8) pixels q1 to q8 around a pixel "$q=(i,j)$". The directions of gradients of pixel q and of each of the pixels q1 to q8 are indicated by the arrows shown in FIG. 6.

In operation S510, the active pixel mapping unit 335 may determine the number of pixel pairs surrounding a pixel of interest (e.g. pixel "q" or pixel "p") whose differences in gradient direction therebetween are greater than a threshold, for example greater than Π/8 radians.

For example, in FIG. 6, pixel pairs q1-q2, q6-q7 and q7-q8 have similar directions. However, pixel pairs q2-q3, q3-q4, q4-q5, q5-q6, q8-q1 have significantly different directions, such that the difference in the directions, measured in radians, between the two pixels in the pair is above a threshold, for example Π/8. Therefore, three (3) pixel pairs surrounding pixel q have below threshold gradient direction differences, while five (5) pixel pairs surrounding pixel q have above threshold gradient direction differences.

Likewise, in FIG. 6, there are eight (8) pixels p1 to p8 around a pixel "p". However, only two (2) pixel pairs p5-p6 and p8-p1 have differences in gradient directions above the threshold.

In operation S520, for every processed pixel $q=(i,j)$, the active pixel mapping unit 335 may use the High Contrast mask and the High Gradient Mask, produced in operation S430 as an additional filter for active pixels. For example, only pairs of pixels with large differences in gradient directions that are also identified as "ink" in the High Contrast Mask or identified as "high gradient" in the High Gradient Mask, are counted. Once the number of such pairs is greater than a threshold the central pixel q is marked as active. The threshold may be, for example, more than four (4) out of (8) pixel pairs or greater than 50% of the pixel pairs.

If in operation S520, the active pixel mapping unit 335 determines that the number of adjacent pairs of pixels surrounding the pixel that are ink or high contrast and have an absolute gradient direction difference higher than the threshold pi/8 is more than four (4) out of eight, then in operation S530, the active pixel mapping unit 335 may set the value of corresponding to the pixel in the Active Pixel Mask as an 'active pixel'.

In contrast, if in operation S520, the active pixel mapping unit 335 determines that the ink or high contrast pixel-pairs having a sufficiently high difference in gradient directions is less than the threshold, then in operation S540, the active pixel mapping unit 335 may set the value of corresponding to the pixel in the Active Pixel Mask as a 'non-active pixel'.

For example, in FIG. 6, for pixel q, the absolute difference in gradient direction of more than four (4) out of eight (8) pairs is higher than the threshold pi/8. If these pixel pairs are identified as "ink" or "high gradient", the active pixel mapping unit 335 may set the value of the pixel q in the Active Pixels Mask to 1 (true) to indicate the pixel q is active.

Likewise, in FIG. 6, pixel p is not considered as an active pixel because less than half of the eight (8) pairs around pixel p have a sufficiently high difference in gradient direction.

However, even if a patch contains a large number of high difference pairs, the active pixel mapping unit 335 may determine the patch merely contains two parallel lines rather than letters and, therefore, that the pixel contained therein is inactive. Therefore, in operation S445, the small text processing unit 220 may detect whether the pixel is part of a dense contrasted line in the dominant direction.

More specifically, the Dense Line Detecting Unit 340 may determine whether the length of a line is relatively long in the dominant direction. The dominant direction may be determined, for example, by the Dominant direction Mapping Unit 330 as discussed above in operation S435.

If the line is relatively long, the Dense Line Detecting Unit 340 may mark, in a black segment pixel map, the current pixel as not being part of a region that contains small text because the length of the line is too long. For example, if the line is part of a relatively large structure (e.g. a drawing, object or sufficiently large text), the Dense Line Detecting Unit 340 may determine that the current pixel should be processed conventionally and make such an indication in the black segment pixel map.

In operation S450, the small text processing unit 220 may detect small text lines within the input maps (e.g., the dominant direction map, the active pixel map, and the black segment pixel map) and generate a line suspect mask that indicates the lines suspected to contain small text.

More specifically, the Small Text Line Detecting Unit 350 may detect small text lines within the input maps, for example, the dominant direction map, generated in operation S435, the active pixel map, generated in operation S440 and the contrasted segment pixel map, generated in operation S445.

Figure 7:
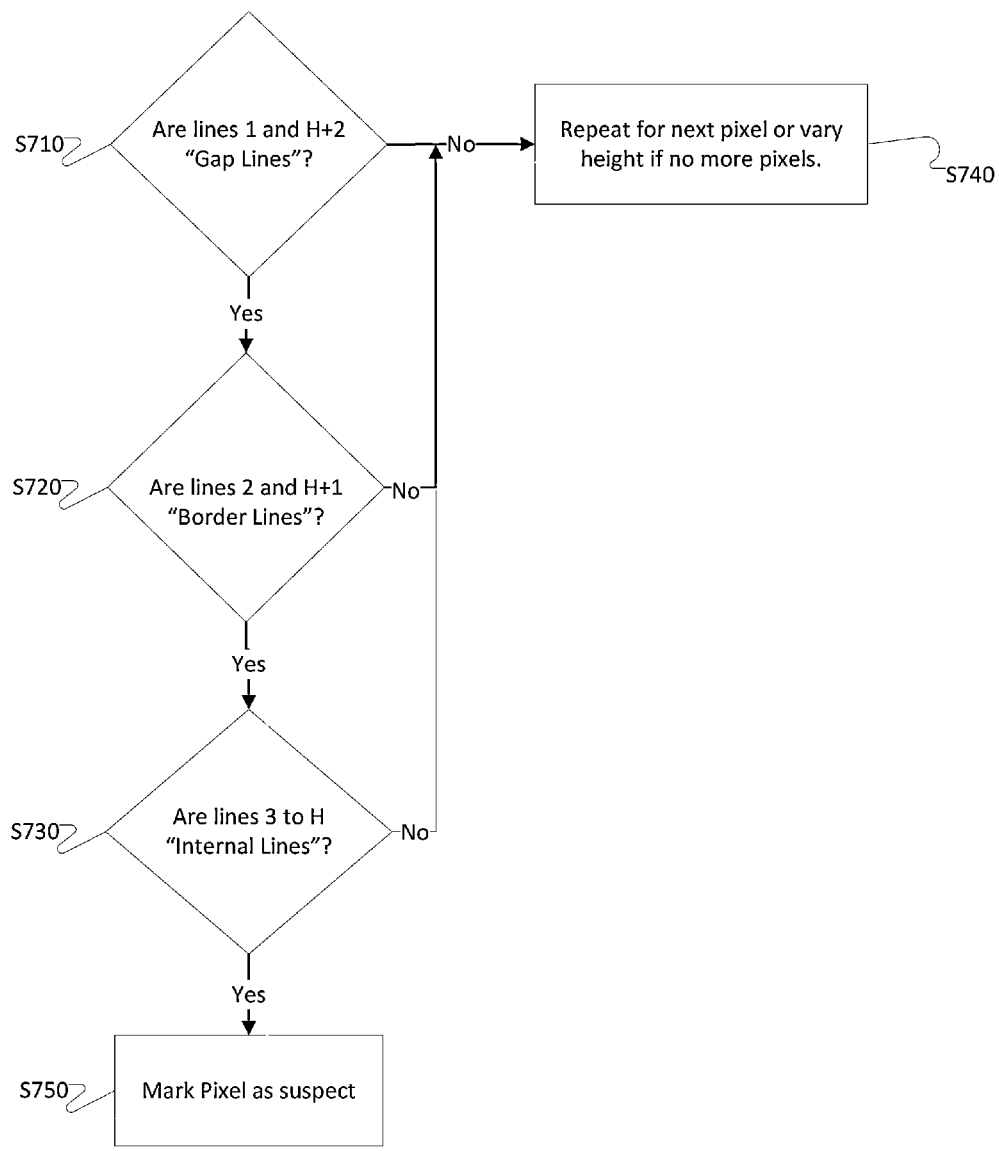
FIG. 7 is a method of a small text processing unit detecting small text suspect lines based on input maps according to an example embodiment.
Figure 8:
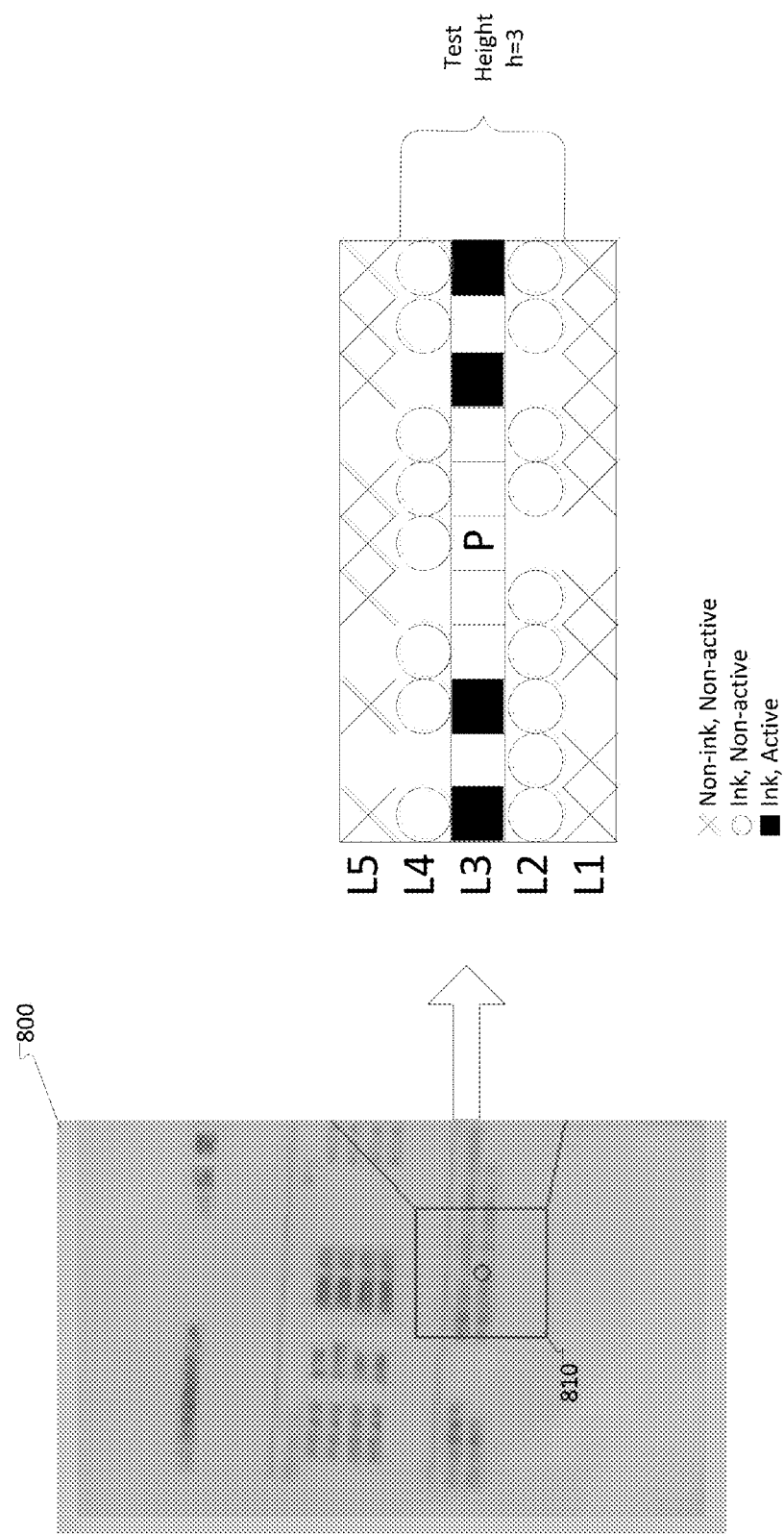
FIG. 8 illustrates input maps used by the small text processor to detect small text lines according to an example embodiment.

FIG. 7 is a method of a small text processing unit detecting small text suspect lines based on input maps according to an example embodiment. FIG. 8 illustrates input maps used by the small text processor to detect small text lines according to an example embodiment.

Referring to FIGS. 7 and 8, an original luminance image 800 having text lines may contain a test patch 810 of pixels, whose center is a test pixel P. The test patch of pixels 810 may have a high contrast mask and an active pixel map corresponding to the tested patch of pixels 810, as discussed above with regard to operations S430 and S440, respectively. The high contrast mask may classify each of the pixels within the test patch 810 as ink or non-ink pixels. Likewise, the active pixel map may classify each of the pixels within the test patch 710 as active or non-active. For the sake of brevity, FIG. 8 illustrates a test patch that is 11 pixels wide, however, example embodiments are not limited thereto, for example the test patch may be between 30-40 pixels wide.

As discussed below, the Small Text Line Detecting Unit 350 may, for each test height H (for example from test height H=3 to 5 pixels) analyze the pixels in the high contrast mask and the active pixel map to determine if pixels within the tested patch are suspected as being small text.

In operation S710, the Small Text Line Detecting Unit 350 may determine if line L1 and line H+2 are Gap lines. The Small Text Line Detecting Unit 350 may determine a line is Gap line if the corresponding line in the high contrast mask and the active pixel map contains at least 60% non-ink and non-active pixels, respectively. The direction of the tested lines in the high contrast mask and the active pixel map is the dominant direction dd of the patch center pixel P extracted from the dominant direction map.

For example, as illustrated in FIG. 8, for a test height H=3, the Small Text Line Detecting Unit 350 may determine if lines L1 and L5 are Gap lines. As illustrated by the "X's" in FIG. 8, since lines L1 and L5 within the patch 810 contain over 60% non-ink and non-active pixels, as indicated by the high contrast mask and the active pixel map, respectively, lines L1 and L5 are considered to be Gap lines.

While the text lines in the patch 810 of the original luminance image 800 may not completely horizontal, but rather slightly slanted, for the sake of brevity, the schematic diagram on the right of FIG. 8 presents horizontal test lines.

In operation S720, the Small Text Line Detecting Unit 350 may determine if line L2 and line H+1 are Border lines. The Small Text Line Detecting Unit 350 may determine a line is a Border line if the corresponding line in the high contrast mask and the active pixel map contains at least 40% ink and non-active pixels, respectively. The direction of the tested lines is the dominant direction dd of pixel P.

For example, as illustrated in FIG. 8, for a test height H=3, the Small Text Line Detecting Unit 350 may determine if lines L2 and L4 are Border lines. As illustrated by the circles in FIG. 8, since lines L2 and L4 within the patch 810 contain at least 40% ink and non-active pixels, as indicated by the high contrast mask and the active pixel map, respectively, lines L2 and L4 are considered to be Border lines.

In operation S730, the Small Text Line Detecting Unit 350 may determine if line 3 to line H are Internal lines. The Small Text Line Detecting Unit 350 may determine a line is an Internal line if the corresponding line in the high contrast mask and the active pixel map contains at least 25% ink and active pixels, respectively. The direction of the tested lines is the dominant direction dd of pixel P.

For example, as illustrated in FIG. 8, for a test height H=3, the Small Text Line Detecting Unit 350 may determine if line L3 is an Internal line. As illustrated by the squares in FIG. 8, since line L3 within the patch 810 contains at least 25% ink and active pixels, as indicated by the high contrast mask and the active pixel map, respectively, line L3 is considered to be Border lines.

In operation S740, if the test pixel P is part of an internal line, and has border lines and gap lines therearound, the Small Text Line Detecting Unit 350 may mark the test pixel P as suspected as being part of a line of small text in a line-suspect mask.

If the test pixel P, does not have gap lines, border lines and internal lines associated therewith, in operation S740, the Small Text Line Detecting Unit 350 may determine whether a next test pixel P is suspected of being part of a line of small text and re-perform operations S710 to S750 using a new patch whose center is the next test pixel P. Further, once the Small Text Line Detecting Unit 350 tests all of the pixels in the image, the Small Text Line Detecting Unit 350 may vary the test height H and re-perform operations S710 to S750 to detect lines of text having different heights. Therefore, the determination of whether pixels are suspect pixels may be considered as a triple nested loop, where, at various tests heights H, each pixel P is analyzed by scanning lines on several masks in order to determine whether the pixel P is a suspect pixel.

Figure 9:
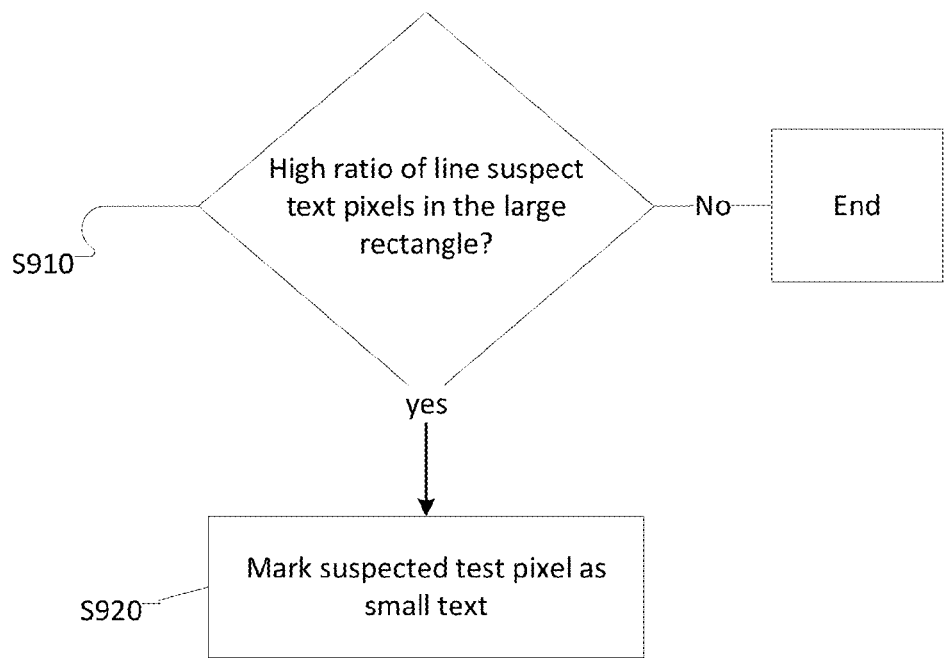
FIG. 9 is a method of small text processing unit determining if suspected small text lines contain small text according to an example embodiment

FIG. 9 is a method of small text processing unit determining if suspected small text lines contain small text according to an example embodiment.

Referring to FIG. 9, in operation S910, for each tested pixel P, the Small Text Line Detecting Unit 350 may determine if a large rectangle (e.g., 9×31 pixels), whose center is the tested pixel P and is oriented in the dominant direction dd of P, contains a high ratio of suspect text pixels in the line-suspect mask. For example, the Small Text Line Detecting Unit 350 may determine whether at least 60% of the pixels in the large rectangle are marked as being suspect text pixels in the line-suspect mask.

In operation S920, if the Small Text Line Detecting Unit 350 determines that there is a high ratio of line-suspect text pixels in the large rectangle, the Small Text Line Detecting Unit 350 may generate a Small Text Mask by marking the suspected tested pixel P at the center of the large rectangle as containing small text.

The Small Text Line Detecting Unit 350 may re-perform operations S910 and S920 on all of the pixels p in the image. Therefore, the determination of whether suspect pixels P contain small text may performed as a double nested loop, where, for each suspect pixel P, the Small Text Line Detecting Unit 350 determine whether the suspect pixel P contains small text.

Figure 10:
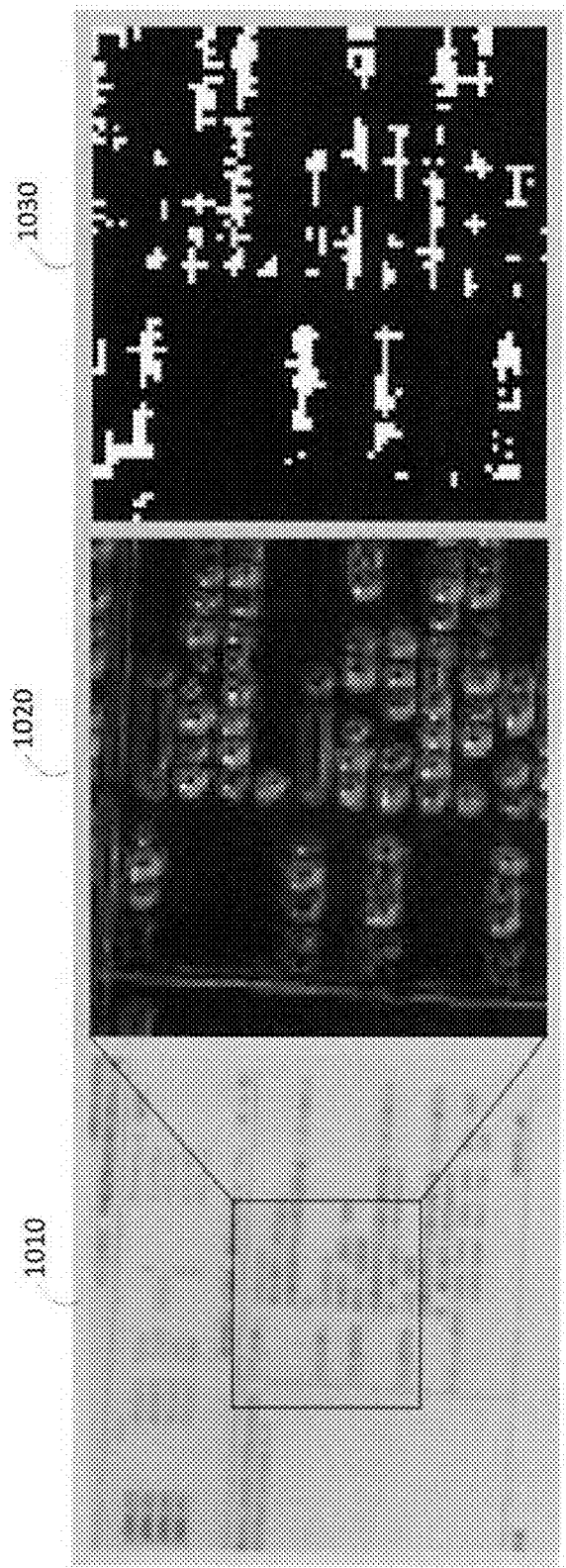
FIG. 10 illustrates digital media undergoing small-font sized text recognition according to an example embodiment.

FIG. 10 illustrates digital media undergoing small-font sized text recognition according to an example embodiment.

As illustrated in FIG. 10, an original image 1010 may have regions containing small text. The Local Gradient and Direction Mapping Unit 315 may generate a local gradient and direction map 1020 whose shade (or, e.g., color, or a combination thereof) represents the local direction of the gradient and whose intensity represents the magnitude of the gradient. As illustrated in FIG. 10, the local gradient and direction map 1020 contains shades (or, e.g., colors, or a combination thereof) that indicate that internal pixels that contain small text have a high variability in direction and high magnitude of the gradient.

The Active Pixel Mapping Unit 335 may generate an active pixel map 1030 that maps pixels whose neighboring pixel pairs have differences in a direction of a gradient above a threshold.

Using the local gradient and direction map 1020 and the active pixel map 1030, the small text line detecting unit 350 may determine whether lines in the original image 1010 contain small text.

Figure 11:
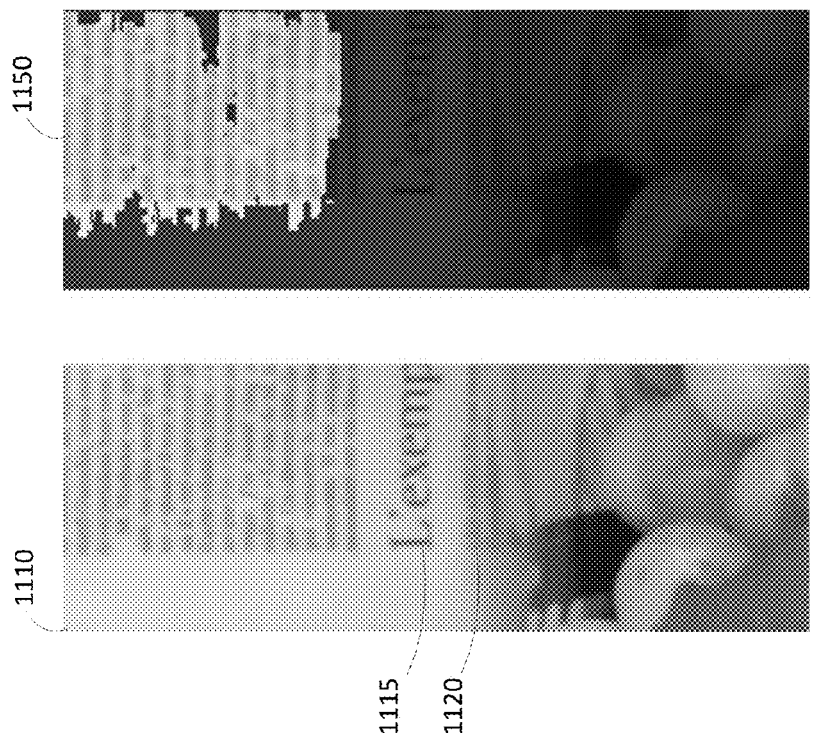
FIG. 11 illustrates a small text mask generated by a small text detector according to an example embodiment.

FIG. 11 illustrates a small text mask generated by a small text detector according to an example embodiment.

As illustrated in FIG. 11, an image 1110 processed by the small text processing unit 222 may produce a small text mask 1150. As illustrated, a large text line 1115 of the image 1110 may not be detected by the small text processing unit 222 since the detector is tuned for detecting font whose height is small (e.g. up to five pixels).

Further, since a large patch size is used in the aforementioned example, a line of small text 1120 at the bottom half of the image may not be detected. The sensitivity of the small text processing unit 222 may be adjusted by increasing the size of the test patch 1110, but such adjustments may also cause false detection of elongated noisy edges with local text-like appearance that are common in man-made and natural objects.

Processing of Regions Determined to Contain Small Text

Referring back to FIGS. 2A and 2B, the image signal processor 220 may process regions differently based on whether the region contains small text. For example, in the image signal processor 220A, the regions that contain small text may be upscaled differently and in the image signal processor 220B, the regions that contain small text may be collected at a higher resolution through an optical zoom.

More specifically, as illustrated in FIG. 2A, the small text processing unit 222 may send the pixels determined to contain small text information to the interpolation processing unit 224A to upscale the small text regions using interpolation. The interpolation processing unit 224A may perform interpolation (e.g. linear, bicubic or spline interpolation) on the small text regions. For example, in bicubic upscaling, the value of each interpolated pixel is determined based on the values of the nearest 16 (4×4) pixels on the original image surrounding the upscaled pixel.

In contrast, the small text processing unit 222 may send pixels that do not contain small text to be upscaled by the edge-preserving processor 226A which upscales the pixels using a relatively more sophisticated upscaling method that preserves sharp edges and reproduces high frequency content in the upscaled image. For example, the edge-preserving processor 226A may perform self-similarity-based upscaling by selectively copy relevant high frequency content from patches of the original image to the upscaled image where relevant patches are chosen by searching and comparing their low frequency content to the corresponding content of a target patch on the upscaled image. Alternatively, the edge-preserving processor 226A may perform example based upscaling by using a dictionary of image exemplars as the source of the missing high frequency content.

Alternatively, as illustrated in FIG. 2B, within the selective optical zoom unit 220B, the small text processing unit 222 may instruct the optical zoom unit 224B to collect higher resolution content in the small text regions by adjusting the lenses within the optical zoom unit 224B to zoom in on the regions that contain small text, thus, capturing sharper images of the small text region that contain more information. While the small text at low resolution can be detected but is often not readable, the zoomed-in high resolution text may be more easily readable. The text may be readable using a character recognition method, allowing automatic textual tagging and categorizing of the image.

The combination processing unit 228B may create a hybrid image, those regions contain content shot with different zooms.

Figure 12:
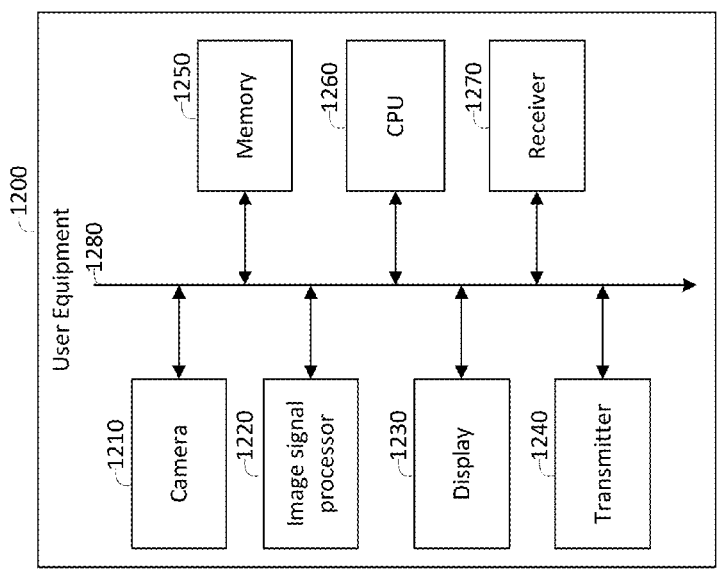
FIG. 12 illustrates user equipment according to an example embodiment.

FIG. 12 illustrates user equipment according to an example embodiment.

Referring to FIG. 12, a user equipment 1200 may include a camera 1210, an image signal processor 1220, a display 1230, a transmitter 1240, a memory 1250, a Central Processing Unit (CPU) 1260, a receiver 1270 and a data bus 1280 that handles communication therebetween.

The camera 1210 may sense an image of an object input through a lens and convert the sensed image into a digital image. The image signal processor 1220 may include a small text processing unit that is configured to recognize small text in a received digital media. The display unit 1230 may display the processed image to a user under the control of the CPU 1260. The camera 1210, the image signal processor 1220, the display unit 1230 and the memory 1250 may represent the image sensing system 10 of FIG. 1.

The transmitter 1240 and receiver 1270 may transmit and receive signals, respectively under the control of the CPU 1160. The transmitter 1240 and receiver 1270 may include hardware and any necessary software for transmitting and receiving wireless signals, respectively, including, for example, data signals, control signals, and signal strength/quality information via one or more wireless connections to other network elements.

While example embodiments have been particularly shown and described, it will be understood by one of ordinary skill in the art that variations in form and detail may be made therein without departing from the spirit and scope of the claims.

I claim:

1. A method for recognizing small-font sized text using a small-text recognition apparatus including a processor, the method comprising:
    receiving, by the processor, digital media of a natural scene, the digital media having at least one frame that includes the small-font sized text;
    generating, by the processor, input maps having values that reflect local properties of corresponding regions in the at least one frame; and
    detecting, by the processor, regions of the at least one frame that contain the small-font sized text by integrating information from the input maps.

2. The method of claim 1, wherein the small-font sized text is text that is between three and five pixels in height.

3. The method of claim 1, wherein the local properties of the regions include at least a contrast, a gradient direction and a magnitude of pixels within the regions.

4. The method of claim 1, wherein the integrated information includes information located between border lines having active pixels therebetween and gaps having a high ratio of non-ink pixels located below a bottom border line and above a top border line in relation to a dominant direction of the text.

5. The method of claim 4, wherein the active pixels are pixels having dense changes in character stroke directions, and the detecting regions of the at least one frame that contain the small-font sized text by integrating the information from the input maps that reflect the local properties includes,
    generating an active pixel map indicating regions having the active pixels.

6. The method of claim 5, wherein the generating the active pixel map includes, for each pixel, statistically measuring the variability of gradient directions of surrounding pixels.

7. The method of claim 5, wherein the generating input maps further includes,
    generating a local gradient magnitude and direction map indicating a gradient and direction within each of the regions;
    generating a dominant direction map indicating, for each pixel, a dominant direction of text lines within the at least one frame in a region surrounding the pixel, the dominant direction being a statistically representative value of the writing direction of character in the region; and
    generating a high contrast mask and a high gradient mask using the gradient magnitude, the high contrast mask indicating a relationship between a luminance of each pixel with a statistical measure of luminance of the region surrounding the pixel, and the high gradient mask indicating a relationship between a gradient magnitude of each pixel with a statistical measure of gradient magnitudes in a region surrounding the pixel.

8. The method of claim 7, wherein the dominant direction map is generated by applying spatial spectral-analysis using a Fourier-related transform to the frame region surrounding the pixel, the dominant direction being perpendicular to the direction of the periodic pattern of the text lines in the region surrounding the pixel.

9. The method of claim 5, wherein the detecting regions of the at least one frame that contain the small-font sized text by integrating the information from the input maps includes,
    determining if a number of sufficiently large differences in gradient directions between pairs of adjacent pixels surrounding a test pixel is greater than a threshold, and
    marking, in the active pixel map, the test pixel as one of the active pixels if the number of sufficiently large differences in gradient directions is greater than the threshold.

10. The method of claim 9, wherein the detecting regions of the at least one frame that contain the small-font sized text further includes,
    determining, using the information from the input maps, if a top and a bottom of a line suspected to contain the small-font sized text contains a high ratio of ink pixels, the ink pixels being pixels having a high contrast in comparison to neighboring pixels;
    determining, using the information from the input maps, if a gap between two lines suspected to contain the small-font sized text contains a high ratio of non-ink pixels; and
    determining, using the information from the input maps, if an internal area in a single line suspected to contain the small-font sized text contains a high ratio of the active pixels and a low ratio of dense ink line pixels.

11. A non-transitory computer readable medium including a computer program comprising:
    computer program instructions configured to implement the method of claim 1 when executed by a processor.

12. A method of processing small font sized text using a small-text recognition apparatus including a processor, the method comprising:
    receiving, by the processor, digital media of a natural scene, the digital media having at least one frame that includes the small-font sized text;
    generating, by the processor input maps having values that reflect local properties of corresponding regions in the at least one frame;
    detecting, by the processor, regions of the at least one frame that contain the small-font sized text by integrating information from the input maps; and
    processing, by the processor, the regions detected to contain small font sized text in a manner different from the regions that do not contain small font sized text.

13. The method of claim 12, wherein the processing of the regions detected to contain the small font sized text includes,
    upscaling the regions determined to contain the small-font sized text differently than the regions determined not to contain the small-font sized text.

14. The method of claim 13, wherein the regions determined to contain the small-font sized text are upscaled using interpolation and the regions determined not to contain the small-font sized text are upscaled using a sharp edge preserving method.

15. The method of claim 12, wherein the processing of the regions detected to contain the small font sized text includes,
   performing an optical zoom procedure on the regions determined to contain the small-font sized text;
   recapturing the regions determined to contain the small-font sized text at a higher optical zoom; and
   performing optical character recognition on the recaptured regions.

16. A small-text recognition apparatus configured to recognize small-font sized text in at least one frame of a received digital media, the apparatus comprising:
   a processor configured to,
      generate input maps having values that reflect local properties of corresponding regions in the at least one frame, and
      detect regions of the at least one frame that contain the small-font sized text by integrating information from the input maps.

17. The small-text recognition apparatus of claim 16, wherein the processor is configured to generate input maps by,
   generating an active pixel map indicating locations of dense changes in character stroke directions within the regions.

18. The small-text recognition apparatus of claim 16, wherein the processor is configured to detect the regions of the at least one frame that contain the small-font sized text by,
   determining if a number of sufficiently large differences in gradient directions between pairs of adjacent pixels surrounding a test pixel is greater than a threshold.

19. The apparatus of claim 15, further comprising:
   an optical zoom unit including an optical lens, the optical lens configured to zoom in on the regions determined to contain the small-font sized text.

20. An imaging device comprising:
   an image sensor configured to capture digital media having at least one frame that includes small-font sized text; and
   the small-text recognition apparatus of claim 16.

* * * * *